April 6, 1954 H. A. SAUNDERS ET AL 2,674,227
LIVESTOCK WATERER WITH HEATER

Filed May 2, 1949 2 Sheets-Sheet 1

INVENTORS
Harold A. Saunders &
Carmen V. Saunders
BY
*Lamphere and Van Valkenburgh*
ATTORNEYS

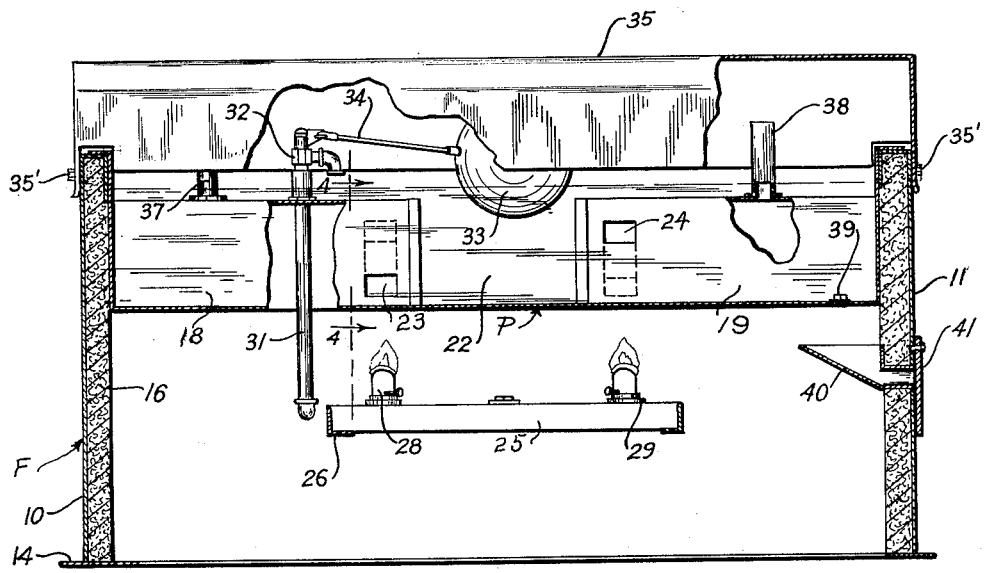
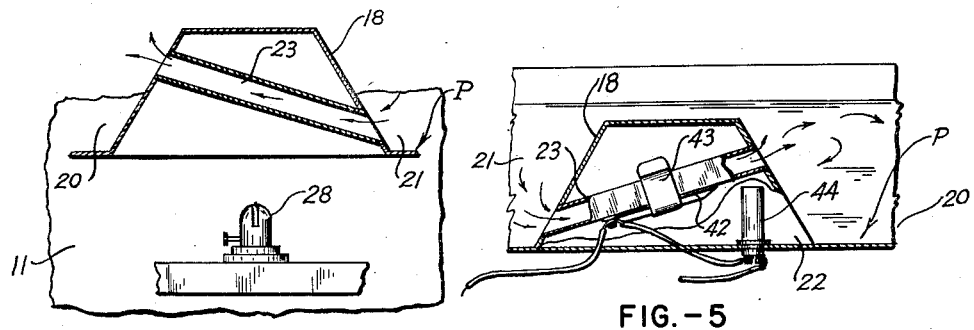
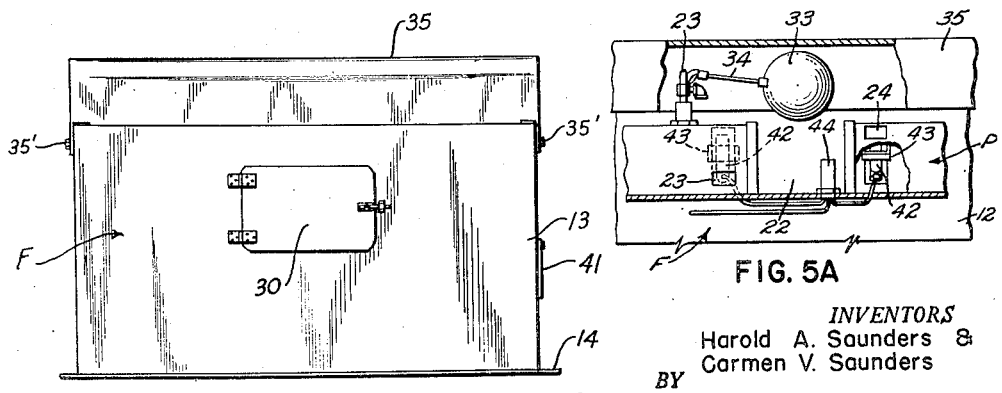

Patented Apr. 6, 1954

2,674,227

UNITED STATES PATENT OFFICE 2,674,227

LIVESTOCK WATERER WITH HEATER

Harold A. Saunders and Carmen V. Saunders, Denver, Colo., assignors to Midstate Manufacturing Company, Denver, Colo., a corporation of Colorado Application May 2, 1949, Serial No. 90,917

4 Claims. (Cl. 119—73)

This invention relates to livestock waterers and more particularly to such a waterer which is capable of year round use, regardless of temperature conditions.

One of the objects of our invention is to produce an improved livestock waterer which will furnish watering facilities for a larger number of animals than prior known waterers having water containing pans of like dimensions.

Another object is to produce a livestock waterer which will be so constructed that the means for automatically maintaining a constant water level in the drinking pan will be easily accessible, fully protected from the livestock and yet occupy a space which will not decrease the watering capacity of the drinking pan.

Still another object is to so construct a livestock waterer and embody therein a heating system for the water that efficient and uniform heating of all portions of the water in the drinking pan will be accomplished.

A further object is to produce improved heating and circulating means for a drinking pan of a stock waterer.

Yet a further object is to so construct a heated livestock waterer that it can be produced at a low cost, will be efficient and convenient as to use, can be easily cleaned and serviced and will be built to have a long life.

Other objects of the invention will become apparent from the following description taken in connection with the accompanying drawings in which:

Figure 2 is a side view of the waterer;

Figure 3 is a longitudinal sectional view taken through the waterer shown in Figure 1 with certain parts broken away to show details of construction;

Figure 4 is a sectional view taken on the line 4—4 of Figure 3;

Figure 5 is a sectional view similar to Figure 4 showing a manner of heating the water electrically;

Figure 5A is a fragmentary side view with parts broken away showing additional details of the electrical heating.

Figure 6:
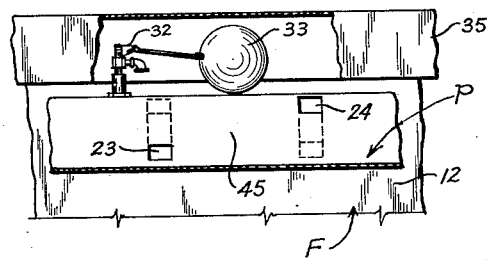
Figure 6 is a fragmentary view showing a modified construction.
Figure 1:
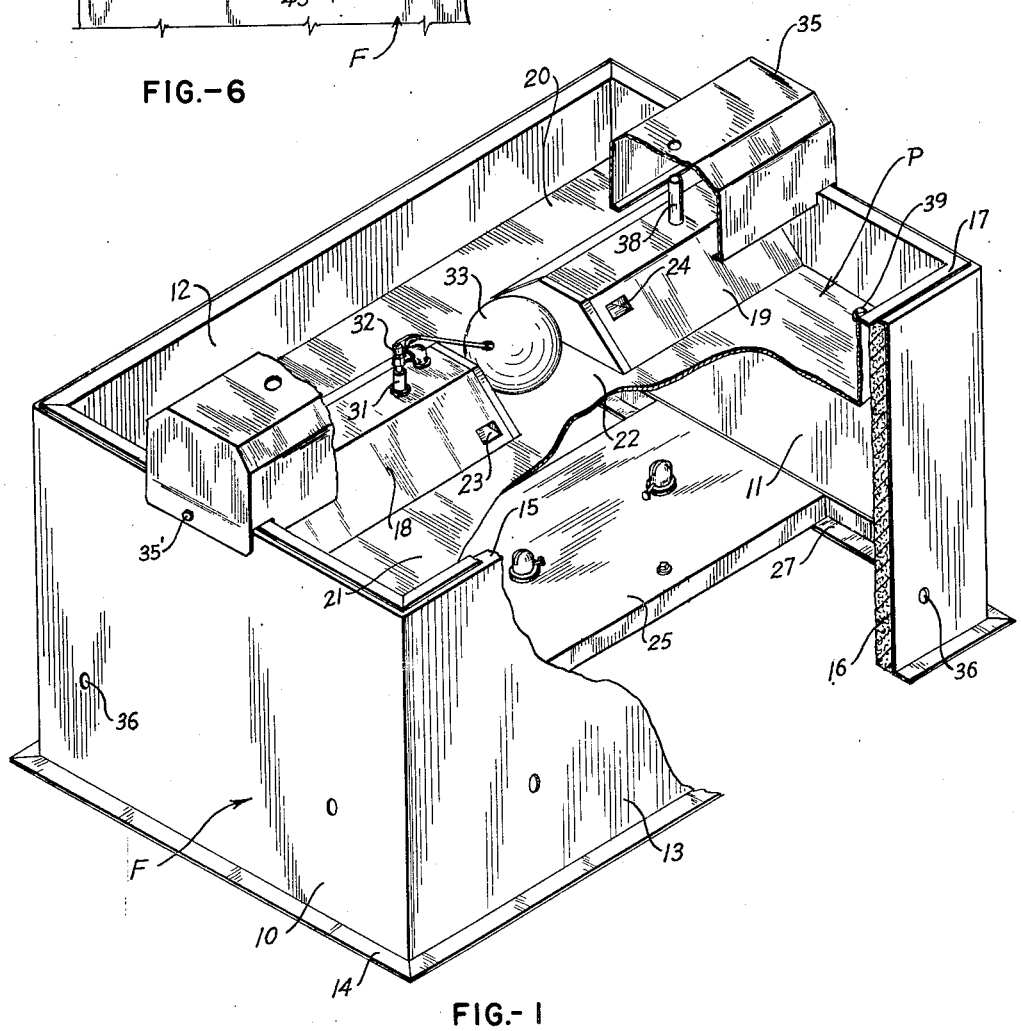
Figure 1 is a perspective view of a livestock waterer embodying our invention, parts being broken away to disclose details of construction and the manner of heating by burners.

Referring to the drawings in detail and first to Figures 1 to 4, our improved livestock waterer is constructed of sheet metal in order to have a long life and not be damaged by the livestock milling around it. The waterer disclosed has a rectangular frame structure F of box-like shape formed by end walls 10 and 11 and longer side walls 12 and 13. The frame can vary in height, depending on the type of animals such as hogs, sheep or cattle to be watered. The bottom marginal portions of the walls have outturned flanges 14 to provide a footing for the structure. The upper marginal portions of the walls have inturned flanges 15 to provide a flat top edge surface. These flanges at the top and bottom of the walls also give strength to the walls. The inside of the frame structure is covered with a suitable insulating material 16 which can be in sheet form.

In the upper part of the frame structure is mounted the drinking pan P which is rectangular in shape and has dimensions substantially the same as the frame structure. The side walls of the pan are of a sufficient height so that enough depth of water can be contained in the pan to enable the animals to drink freely. The side walls of the pan at the top marginal portions have outwardly extending flanges 17 for hanging the pan on the inturned top flanges 15 of the side walls of the frame. In this manner the pan will be nested into the top of the walls of the frame structure and mounted for convenient removal when found desirable.

The bottom of the drinking pan P along the longitudinal (greatest length) center line thereof is formed so as to provide two drinking sections 20 and 21 extending along the sides 12 and 13 of the waterer, which sides are those having the greatest length. The elevated portions extend inwardly from the ends of the pan and have their inner ends spaced apart so there is established an open top channel 22 between the two drinking sections. The elevated portions or ridge means, as shown, are constructed to have a shape similar to that of a half of a hexagonal column. The bottoms of the elevated portions are open.

The elevated portions 18 and 19 in the pan not only divide the pan into two drinking sections, but function as part of a means for efficiently heating the water in the pan by aiding in establishing circulation of the water. The elevated portion 18 has extending therethrough a conduit 23 and the elevated portion 19 has extending therethrough a conduit 24. These conduits are inclined in opposite directions. Thus conduit 23 will communicate with drinking section 21 at a lower point than it will with drinking section 20, and conduit 24 will communicate with drinking section 20 at a lower point than it will with drinking section 19.

In order that the water may be heated in cold weather to prevent freezing and also so the temperature will be warm enough to encourage adequate drinking by an animal, a heating means is provided in the compartment of the waterer below the drinking pan. The heating means shown in the waterer of Figures 1 to 3 consists of a fuel oil burner of the wick type. A receptacle 25 is mounted on two cross extending L-section channel members 26 and 27. The receptacle has two wick type burners 28 and 29 screwed into its top. The receptacle and burners are removable through a suitable door 30 in the side wall 13 of the frame structure. The receptacle is long and narrow and the length of the door opening is such that by shifting the receptacle it will pass therethrough.

The burners are so mounted on the fuel oil receptacle that when the receptacle is positioned on the cross channels the lamp 28 will be directly beneath conduit 23 and the lamp 29 will be directly beneath conduits 24. Thus, heat from the lighted burners will be transferred directly to the water in the conduits. As the water in the conduits is heated, convection currents will be established and due to the inclination of the conduits, water will circulate through each conduit in a direction from the low end to the high end. Since the conduits are inclined in opposite directions, there will be a flow of water from drinking section 20 to drinking section 21 through conduit 24, and from drinking section 21 to drinking section 20 through conduit 23. This circulation will insure substantially uniform heating of all the water in the drinking pan. Colder water from the bottom of each drinking section will always be heated. Figure 4 shows the manner of movement of water through conduit 23.

Water is supplied to the drinking pan through a pipe 31 which extends upwardly through the top of elevated portion 18. At the top of this pipe is a control valve 32 which is automatically opened and closed by a float 33 connected therewith by a rod 34. The float is arranged to be positioned in the open top channel 22 between the inner ends of the elevated portions. By providing the channel, the float can be placed in a position where it will not be in either drinking section of the waterer and interfered with by animals during drinking.

The elevated portions 18 and 19 and the float are protected by an elongated cover 35. This cover is of U-shaped cross section and mounted with its open side downward. The cover is of such width as to fully protect the float and elevated portions, but will not obstruct free access to the drinking sections. The cover is detachably connected to the end walls 10 and 11 of the frame structure by bolts 35'. When the cover is removed, free access can be had to the valve and float structure.

Air holes 36 are provided in the frame walls so the burners will operate satisfactorily. Pipes 37 and 38 extend upwardly from the elevated sections to points above the water level to allow gases to escape from the burners. The drinking pan has a drain plug 39 and below the drain hole is a trough 40 for conducting the drained water to the exterior of the waterer. The discharge end of the trough is closed by a pivoted plate 41.

In Figure 5 and Figure 5A there is disclosed a manner of electrically heating the water if such type of heating is desired. To the conduit 23 is attached a suitable electrical heating element 42 by a clamp 43. This attachment holds the heating element in direct engagement with the conduit metal material and heat will be directly transferred to the water. A like heating element is attached to conduit 24. The heating elements are connected in a single circuit, which circuit is controlled by a thermostat 44. The thermostat is mounted in a protected position below the cover in the bottom of channel 22 so as to be subject to water temperature. When the water reaches a desired temperature, the thermostat will open the circuit and thus cut off the heating elements. If the water temperature drops the thermostat will cause the circuit to be closed and the heating elements to again become operative.

From the foregoing description of our improved livestock waterer it is seen that the water supply thereto is automatically controlled and efficient heating of the water is accomplished when desired during cold weather. The waterer is ruggedly constructed and all parts are protected against damage. The waterer can be easily cleaned and serviced. The compartment below the watering pan is insulated so heating of the water can be efficient. The divided arrangement of the watering pan to provide two drinking sections permits the waterer to be placed in a fence so that animals in two separated yards can be watered. By having the two watering sections extending along the longer sides of the waterer, the watering capacity will be a maximum for a given area of the drinking pan. Thus, if the frame structure is, for example, built to be four feet by five feet in dimensions, then with the elevated portions extending along the longitudinal center line instead of the shorter cross center line, there will be available drinking sections having a total length of ten feet, as compared with six feet the other way. Thus, more animals can drink at a time. In prior waterers of this type the raised portions and cover extended across the waterer in the short direction and, because of this, maximum capacity for watering was not obtained, although the cost of such waterer was the same as our improved waterer where like dimensions are present.

In Figure 6 is shown a modified pan structure. Instead of having two elevated portions lengthwise across the pan with a channel between, a single continuous elevated portion can be employed as indicated at 45. This single elevated portion will be of less height than the two elevated sections shown in Figure 1 in order to give room between the top thereof and the cover for the float 33 to operate. This float can be made somewhat smaller if necessary. The elevated portion 45 is provided with the two oppositely inclined conduits 23 and 24 to accomplish efficient heating by establishing convection currents.

The waterer disclosed as embodying our invention is primarily designed for cattle. For sheep or hogs the height and perimeter dimensions will be less. If less heating is required, a single conduit can be employed through the elevated portion and a single heating device associated therewith. Since the water level will be above the elevated portion, water circulation will be provided even though a single conduit is employed. Therefore, being aware of the possibility of modifications in the particular waterer shown by way of example embodying our invention without departing from the fundamental principles of the invention, we desire it to be understood that the scope of the invention is not to be limited except in accordance with the appended claims.

What is claimed is:

1. In a livestock waterer, a rectangular frame structure having end walls and side walls with the side walls being longer than the end walls, a drinking pan having dimensions similar to the frame and being mounted in the upper portion of said frame structure, said drinking pan being provided with ridge means extending in the direction of the greatest length of the pan and along the central part of the pan, two conduits extending through the ridge means to thus permit water to flow from one side of the pan to the other, and separate means for applying heat to each of the conduits, said conduits being inclined in opposite directions so that with heat acting thereon convection currents will be created causing water to flow from one side of the ridge means to the other side through one conduit and from the said other side of the ridge means to the said one side through the other conduit.

2. In a livestock waterer, a rectangular frame structure having end walls and side walls, a drinking pan mounted in the upper portion of the frame structure, said drinking pan being provided with ridge means extending longitudinally along the central part of the pan and open at the bottom of the pan, inclined conduits extending through the ridge means to permit water to flow from one side of the pan to the other, said conduits being inclined in opposite directions and means for applying heat to the conduits, said last named means including an electrical heating element positioned directly against the bottom only of each of the conduits, and a clamp means for removably holding each heating element in position.

3. In a livestock waterer, a rectangular frame structure having end walls and side walls with the side walls being longer than the end walls, a drinking pan having dimensions similar to the frame and being mounted in the upper portion of said frame structure, said drinking pan being provided with an elevated bottom means extending along the longitudinal central line of the pan, two inclined conduit means through the elevated portion for permitting water to flow from one side of the elevated portion to the other, said conduit means being inclined in opposite directions, separate means for applying heat to each of the conduit means, a cover of U-shaped cross section attached to the end walls only of frame structure with its open side downward and extending over the entire elevated bottom portion of the pan, and means for conducting water to the pan and automatically maintaining it at a substantially constant level including a valve and a float positioned below the cover.

4. In a livestock waterer, a frame structure, a rectangular drinking pan mounted in the top portion of the frame structure and having greater dimensions in one direction than in the other, said pan having elevated bottom portions extending inwardly from its ends along the center line of the pan and in spaced apart relation to provide an open topped channel between opposite sides of the pan, means for supplying water to the pan including a pipe extending through one elevated portion and a control valve for the pipe, means comprising a float positioned in the channel for controlling the valve, two inclined conduit means through the elevated portions, said conduits being inclined in opposite directions, separate means for heating each of the conduit means, and a removable cover for the float, said cover permitting free access by livestock to the pan on opposite sides of the elevated bottom portions.

References Cited in the file of this patent

UNITED STATES PATENTS

| Number | Name | Date |
| --- | --- | --- |
| 1,140,864 | Aubery | May 25, 1915 |
| 1,341,070 | Pruden | May 25, 1920 |
| 1,423,742 | Silverman | July 25, 1922 |
| 1,429,535 | Richards et al. | Sept. 19, 1922 |
| 1,470,384 | Long | Oct. 9, 1923 |
| 1,476,095 | Morgan | Dec. 4, 1923 |
| 1,640,292 | Petrick | Aug. 23, 1927 |
| 1,650,489 | Brechtbill | Nov. 22, 1927 |
| 1,663,255 | Hynes | Mar. 20, 1928 |
| 1,862,217 | Gay et al. | June 7, 1932 |
| 2,455,211 | Armstrong | Nov. 30, 1948 |

FOREIGN PATENTS

| Number | Country | Date |
| --- | --- | --- |
| 49,610 | Sweden | July 13, 1921 |